(12) United States Patent (10) Patent No.: US 9,385,845 B1
Austern et al. (45) Date of Patent: Jul. 5, 2016

(54) DISTRIBUTING GLOBAL VALUES IN A GRAPH PROCESSING SYSTEM

(75) Inventors: Matthew H. Austern, Palo Alto, CA (US); James C. Dehnert, Palo Alto, CA (US); Aart J. C. Bik, Union City, CA (US); Grzegorz Czajkowski, Redwood City, CA (US); Grzegorz Malewicz, Tokyo (JP)

(73) Assignee: Google Inc., Mountain View, CA (US)

( * ) Notice: Subject to any disclaimer, the term of this patent is extended or adjusted under 35 U.S.C. 154(b) by 1115 days.

(21) Appl. No.: 13/449,249

(22) Filed: Apr. 17, 2012

Related U.S. Application Data

(60) Provisional application No. 61/477,559, filed on Apr. 20, 2011, provisional application No. 61/483,183, filed on May 6, 2011.

(51) Int. Cl.
*H04L 29/08* (2006.01)
*H04L 5/00* (2006.01)

(52) U.S. Cl.
CPC ........ *H04L 5/0032* (2013.01); *H04L 29/08135* (2013.01)

(58) Field of Classification Search
None
See application file for complete search history.

(56) References Cited

U.S. PATENT DOCUMENTS

| | | | |
|---|---|---|---|
| 5,734,833 A | 3/1998 | Chiu et al. | |
| 7,392,258 B2 | 6/2008 | Bogner et al. | |
| 8,429,110 B2 | 4/2013 | Cai et al. | |
| 8,458,229 B2 | 6/2013 | Oliver et al. | |
| 2006/0031509 A1* | 2/2006 | Ballette et al. | 709/226 |
| 2006/0212860 A1 | 9/2006 | Benedikt et al. | |
| 2008/0195577 A1* | 8/2008 | Fan et al. | 707/2 |
| 2008/0216077 A1 | 9/2008 | Emani et al. | |
| 2008/0271022 A1 | 10/2008 | Strassner et al. | |
| 2009/0044180 A1* | 2/2009 | Luszczek et al. | 717/149 |
| 2009/0055343 A1 | 2/2009 | Van Lunteren | |
| 2010/0017537 A1 | 1/2010 | Linnartz et al. | |
| 2010/0042676 A1* | 2/2010 | Seroussi et al. | 709/203 |
| 2010/0241827 A1* | 9/2010 | Yu | H04L 12/44 712/30 |
| 2010/0250517 A1* | 9/2010 | Bendel et al. | 707/714 |
| 2011/0307436 A1 | 12/2011 | Cai et al. | |
| 2011/0314075 A1 | 12/2011 | Boldyrev et al. | |

OTHER PUBLICATIONS

Kang, F., et al., "Correlated Label Propagation with Application to Multi-label Learning," Proceedings of the 2006 IEEE Computer Society Conference on Computer Vision and Pattern Recognition (CVPR'06), 2006, pp. 1719-1726.

(Continued)

*Primary Examiner* — Angela Nguyen
(74) *Attorney, Agent, or Firm* — Fish & Richardson P.C.

(57) ABSTRACT

A value is distributed in a distributed computing system having a master system in communication with a plurality of worker systems. Partitions of a graph are assigned to the worker systems. The graph represents relationships among a set of tangible items that model a real-world condition having an associated problem. Configuration information is determined that describes a configuration of the distributed computing system. A distribution scheme is selected for distributing a value from the master system to the plurality of worker systems based on the configuration information. The value is distributed from the master system to the worker systems according to the selected distribution scheme. The worker systems are configured to use the value to produce an output representing a solution to the real-world problem.

23 Claims, 7 Drawing Sheets

(56) References Cited

OTHER PUBLICATIONS

Rao, D., et al., "Ranking and Semi-supervised Classification on Large Scale Graphs Using Map-Reduce," Proceedings of the 2009 Workshop on Graph-based Methods of Natural Language Processing, ACL-IJCNLP 2009, pp. 58-65.
Anderson, T., et al., "High-Speed Switch Scheduling for Local-Area Networks," *ACM Trans. Comp. Syst.* 11(4): 319-352, 1993.
Bader, D., et al., "Designing Multithreaded Algorithms for Breadth-First Search and st-connectivity on the Cray MTA-2," in *Proc. 35th Intl. Conf. on Parallel Processing* (ICPP'06), Columbus, Ohio, Aug. 2006, pp. 523-530.
Barroso, L., et al., "Web search for a planet: The Google Cluster Architecture," *IEEE Micro* 23(2):22-28, 2003.
Bayati, M., et al., "Maximum Weight Matching via Max-Product Belief Propagation," in *Proc. IEEE Intl. Symp. On Information Theory*, pp. 1763-1767, 2005.
Bellman, R., "On a routing problem," *Quarterly of Applied Mathematics* 16(1):87-90, 1958.
Bonorden, O., et al., "The Paderborn University BSP (PUB) library," *Parallel Computing* 29:187-207, 2003.
Brin, S., et al., "The Anatomy of a Large-Scale Hypertextual Web Search Engine," in *Proc. 7th Intl. Conf on the World Wide Web*, pp. 107-117, 1998.
Chan, A., et al., "CGMGRAPH/CGMLIB: Implementing and Testing CGM Graph Algorithms on PC Clusters and Shared Memory Machines," *Intl. J. of High Performance Computing Applications* 19(1):81-97, 2005.
Chang, F., et al., "Bigtable: A Distributed Storage System for Structured Data," *ACM Trans. Comp. Syst.* 26(2) Article 4, 26 pages, 2008.
Cherkassky, B., et al., "Shortest paths algorithms: Theory and experimental evaluation," *Mathematical Programming* 73:129-174, 1996.
Cohen, J., "Graph Twiddling in a MapReduce World," *Comp. in Science & Engineering*, pp. 29-41, Jul./Aug. 2009.
Crobak, J., et al., "Advanced Shortest Paths Algorithms on a Massively-Multithreaded Architecture," in *Proc. First Workshop on Multithreaded Architectures and Applications*, pp. 1-8, 2007.
Czajkowski, G., "Large-scale graph computing at Google," Google Research Admin., Jun. 2009, 1 page, [online][retrieved Jul. 20, 2012] retrieved from the internet <http://googleresearch.blogspot.com/2009/06/large-scale-graph-computing-at-google.html>.
Daly, J., "A higher order estimate of the optimum checkpoint interval for restart dumps," *Future Generation Computer Systems* 22:303-312, 2006.
Dean, J., et al., "MapReduce: Simplified Data Processing on Large Clusters," in *Proc. 6th USENIX Symp. On Operating Syst. Design and Impl.*, pp. 137-150, 2004.
Dijkstra, E., et al., "A Note on Two Problems in Connexion with Graphs," *Numerische Mathematik* 1:269-271, 1959.
Erwig, M., "Inductive graphs and functional graph algorithms," *J. Functional Programming* 11(5):467-492, Sep. 2001.
Ghemawat, S., et al., "The Google File System," in *Proc. 19th ACM Symp. On Operating Syst. Principles*, pp. 29-43, 2003.
Google Project Hosting, "Protobuf: Protocol Buffers—Google's data interchange format," 2 pages, [online] [retrieved Jul. 20, 2012] retrieved from the internet <http://code.google.com/p/protobuf/ 2009>.
Goudreau, M., et al., "Portable and Efficient Parallel Computing Using the BSP Model," *IEEE Transactions on Computers* 48(7): 670-689, 1999.
Gregor, D., et al., "Lifting Sequential Graph Algorithms for Distributed-Memory Parallel Computation," in *Proc. Of Parallel Object-Oriented Scientific Computing (POOSC)*, 15 pages, Jul. 2005.
Gregor, D., et al., "The Parallel BGL: A Generic Library for Distributed Graph Computations," in *Proc. 2005 ACM SIGPLAN Conf. on Object-Oriented Prog., Syst., Lang., and Applications (OOPSLA'05)*, pp. 423-437, Oct. 2005.
Hagberg, A., et al., "Exploring Network Structure, Dynamics, and Function using NetworkX," in *Proc. 7th Python in Science Conf.*, pp. 11-15, 2008.
Hill, J., et al., "BSPlib: The BSP programming library," *Parallel Computing* 24:1947-1980, 1998.
Isard, M., et al., "Dryad: Distributed Data-Parallel Programs from Sequential Building Blocks," in *Proc. European Conf. on Computer Syst.*, pp. 59-72, 2007.
Kang, U., et al., "PEGASUS: A Peta-Scale Graph Mining System—Implementation and Observations," in *Proc. Intl. Conf. Data Mining*, pp. 229-238, 2009.
Lumsdaine, A., et al., "Challenges in Parallel Graph Processing," *Parallel Processing Letters* 17:5-20, 2007.
Madduri, K., et al., "A Faster Parallel Algorithm and Efficient Multithreaded Implementations for Evaluation Betweenness Centrality on Massive Datasets," in *Proc. 3rd Workshop on Multithreaded Architectures and Applications (MTAAP'09)*, Rome, Italy, May 2009, 8 pages.
Madduri, K., et al., "Parallel Shortest Path Algorithms for Solving Large-Scale Instances," *DIMACS Implementation Challenge—The Shortest Path Problem*, 39 pages, 2006.
Malewicz, G., "A Work-Optimal Deterministic Algorithm for the Certified Write-All Problem with a Nontrivial Number of Asynchronous Processors," *SIAM J. Comput.* 34(4):993-1024, 2005.
Malewicz, G., et al., "Pregel: A System for Large-Scale Graph Processing," in *Comm. ACM SIGMOD/POD*, Indianapolis, Indiana, Jun. 6-10, 2010, 11 pages.
Meyer, U., et al., "Design and Implementation of a Practical I/O-efficient Shortest Paths Algorithm," in *Proc. 3rd Workshop on Multithreaded Architectures and Applications (MTAAP'09)*, Rome, Italy, May 2009, 12 pages.
Meyer, U., et al., "Δ-stepping: a parallelizable shortest path algorithm," *Journal of Algorithms* 49:114-152, 2003.
Munagala, K., et al., "I/O-Complexity of Graph Algorithms," in *Proc. 10th Annual ACM-SIAM Symp. On Discrete Algorithms*, pp. 687-694, 1999.
Olston, C., et al., "Pig Latin: A Not-So-Foreign Language for Data Processing," in *Proc. ACM SIGMOD Intl. Conf. on Management of Data*, pp. 1099-1110, 2008.
Pike, R., et al., "Interpreting the data: Parallel analysis with Sawzall," *Scientific Programming* 13(4):277-298, 2005.
Thorup, M., "Undirected Single-Source Shortest Paths with Positive Integer Weights in Linear Time," *J. ACM* 46(3):362-394, May 1999.
Valiant, L., "A Bridging Model for Parallel Computation," *Comm. ACM* 33(8):103-111, 1990.
Wikipedia, "Bulk synchronous parallel," 3 pages, [online] [retrieved on Mar. 10, 2010] retrieved from the internet <http://en.wikipedia.org/w/index.php?title=Bulk_synchronous_parallel&oldid=349030784>.
Wikipedia, "Distributed computing," 8 pages, [online] [retrieved Mar. 23, 2010] retrieved from the internet <http://en.wikipedia.org/w/index.php?title=Distributed_computing&oldid=351626983>.
Yoo, A., et al., "A Scalable Distributed Parallel Breadth-First Search Algorithm on BlueGene/L," in *Proc. 2005 ACM/IEEE Conf. on Supercomputing (SC'05)*, pp. 25-43, 2005.
Yu, Y., et al., "DryadLINQ: A System for General Purpose Distributed Data-Parallel Computing Using a High-Level Language," in *Proc. 8th USENIX Symp. On Operating Syst. Design and Implementation*, pp. 10-14, 2008.
Ziv, A., et al., "An On-Line Algorithm for Checkpoint Placement," *IEEE Transactions on Computers* 46(9):976-985, Sep. 1997.

\* cited by examiner

DISTRIBUTING GLOBAL VALUES IN A GRAPH PROCESSING SYSTEM

CROSS-REFERENCE TO RELATED APPLICATIONS

This application claims the benefit of U.S. Provisional Application No. 61/477,559, filed Apr. 20, 2011, and U.S. Provisional Application No. 61/483,183, filed May 6, 2011, each of which is hereby incorporated herein by reference.

BACKGROUND

1. Technical Field

This invention pertains in general to distributed computing and in particular to graph processing using a distributed computer system.

2. Background Information

A distributed computing system includes multiple autonomous computers that communicate through a network. The computers interact with each other via the network to solve a common problem. For example, a complex problem can be divided into many smaller, less complex problems, and solved in parallel by the multiple computers in the distributed system.

Graph processing is a type of problem that can be solved using distributed systems. In graph processing, a computing problem is represented by a graph having a set of vertices connected by a set of edges. The graph can be used to model a real-world condition, and then the graph processing can act on the graph to analyze the modeled condition. For example, the World Wide Web can be represented as a graph where web pages are vertices and links among the pages are edges. In this example, graph processing can analyze the graph to provide information to a search engine process that ranks search results. Similarly, a social network can be represented as a graph and graph processing can analyze the graph to learn about the relationships in the social network. Graphs can also be used to model transportation routes, paths of disease outbreaks, citation relationships among published works, and similarities among different documents.

Efficient processing of large graphs in a distributed computing system is challenging. Graph processing often exhibits poor locality of memory access, very little work per vertex, and a changing degree of parallelism over the course of execution. Distribution over many computers exacerbates the locality issue, and increases the probability that a computer will fail during computation. These challenges continue to occur and are growing in significance as graph processing is used to model more real-world conditions and the sizes of the graphs increase.

SUMMARY OF THE INVENTION

The above and other needs are met by a method, a non-transitory computer-readable storage medium and a system for distributing a value in a distributed computing system having a master system in communication with a plurality of worker systems. Embodiments of the method comprise assigning partitions of a graph to the worker systems. The graph represents relationships among a set of tangible items that model a real-world condition having an associated problem. Configuration information is determined that describes a configuration of the distributed computing system. A distribution scheme is selected for distributing a value from the master system to the plurality of worker systems based on the configuration information. The value is distributed from the master system to the worker systems according to the selected distribution scheme. The worker systems are configured to use the value to produce an output representing a solution to the real-world problem.

Embodiments of the non-transitory computer-readable storage medium store executable computer program instructions. The computer program instructions include instructions for assigning partitions of a graph to the worker systems and determining configuration information describing a configuration of the distributed computing system. The instructions include instructions for selecting a distribution scheme for distributing a value from the master system to the plurality of worker systems based on the configuration information. The instructions also include instructions for distributing the value from the master system to the worker systems according to the selected distribution scheme. The worker systems are configured to use the value to produce an output representing a solution to the real-world problem.

Embodiments of the system comprise a non-transitory computer readable storage medium storing processor-executable computer program instructions and a processor for executing the instructions. The computer program instructions include instructions for assigning partitions of a graph to the worker systems and determining configuration information describing a configuration of the distributed computing system. The instructions include instructions for selecting a distribution scheme for distributing a value from the master system to the plurality of worker systems based on the configuration information. The instructions also include instructions for distributing the value from the master system to the worker systems according to the selected distribution scheme. The worker systems are configured to use the value to produce an output representing a solution to the real-world problem.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
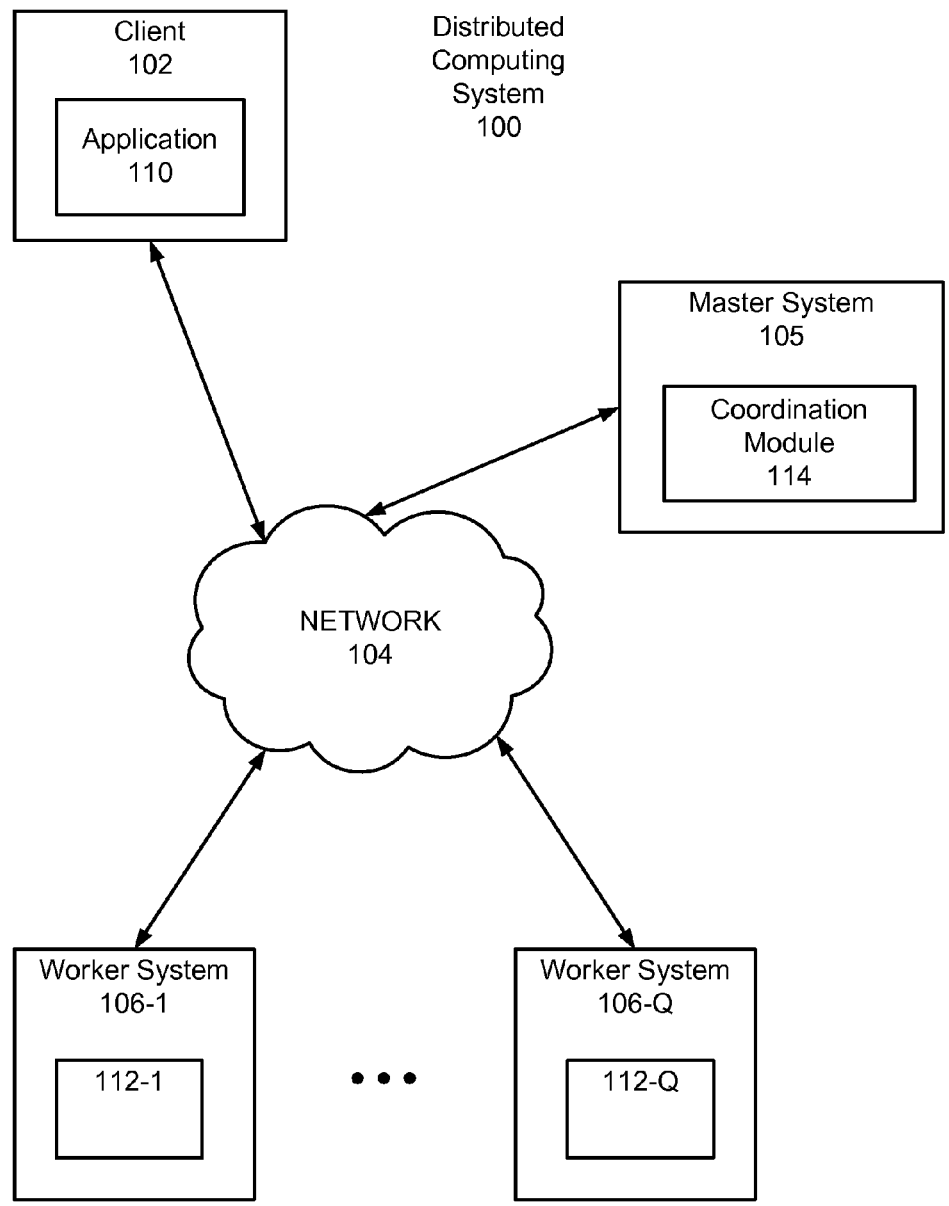
FIG. 1 is a high-level block diagram of a computing environment, according to one embodiment.

FIG. 1 is a high-level block diagram of a distributed computing system 100 for performing scalable fault-tolerant processing of large scale graphs. FIG. 1 illustrates a client 102, a master system 105 and worker systems 106 connected by a network 104. Collectively, the distributed computing system 100 is used to define a graph modeling real-world conditions as a set of relationships among a tangible set of items, such as documents and links on the Internet, transportation routes, or a social graph. In addition, the distributed computing system 100 is used to analyze the modeled conditions in order to solve one or more real-world problems associated with the conditions. This analysis may apply one or more algorithms to the graph, such as algorithms for shortest path computations, clustering, web page ranking, graph cutting, etc.

At a high-level, the client 102 is used to provide graph data describing the graph and to specify an algorithm to be performed on the graph data. In one embodiment, the graph is a directed graph and is represented as a set of vertices connected by a set of directed edges. As used herein, the vertices and the edges of a graph are collectively referred to as graph components. The master system 105 assigns partitions of the graph data to the worker systems 106. The worker systems 106 perform the specified algorithm on the partitions of the graph data within their respective ambits.

In more detail, the client 102 specifies a directed graph in which each vertex is uniquely identified by a string vertex identifier. Each vertex is also associated with a modifiable, user-defined value. The directed edges are associated with their source vertices, and each edge has a modifiable, user-defined value and a target vertex identifier. Vertices communicate directly with one another by sending messages, each of which includes a message value and the name of the destination vertex. In some embodiments, the vertices send requests to other vertices to add, modify or remove vertices and edges.

A typical computation includes initialization of a graph and execution of the algorithm on multiple worker systems 106. The algorithm performs a sequence of supersteps separated by global synchronization points until the algorithm terminates and produces an output. Within each superstep, the vertices compute in parallel, each executing a defined function that expresses the logic of the algorithm. A vertex can modify its state or that of its outgoing edges, receive messages sent to it in the previous superstep, send messages to other vertices (to be received in the next superstep), or even mutate the topology of the graph.

The algorithm terminates based on every vertex voting to halt and there being no messages in transit. In superstep 0 (the initial superstep), every vertex is in the active state; all active vertices participate in the computation of any given superstep. A vertex deactivates itself by voting to halt. Halting means that the vertex has no further work to do unless triggered externally, and that vertex will not execute in subsequent supersteps unless it receives a message. If reactivated by a message, a vertex must explicitly deactivate itself again. The algorithm as a whole terminates when all vertices are simultaneously inactive and there are no messages in transit.

The output of the algorithm is a set of values explicitly output by the vertices. For example, a clustering algorithm might generate a small set of disconnected vertices selected from a large graph. In another example, a graph mining algorithm might simply output aggregated statistics mined from the graph. The output represents a solution to the real-world problem associated with the modeled conditions involving the set of relationships among the set of items. For example, the output might be a set of search results, a transportation route, an analysis of the spread of a disease, or a recommendation for an item.

Turning now to the specific entities illustrated in FIG. 1, the client 102 is a computing device with a processor and a memory that includes an application 110 for providing the master system 105 with a user program and graph data. The user program defines the algorithm to perform on the graph data. An example of the algorithm is a shortest path algorithm that finds a shortest path between a single source vertex and every other vertex in the graph. The application 110 sends a copy of the user program to the master system 105. The application 110 also sends graph data or a location of the graph data to the master system 105.

The master system 105 is likewise a computing device with a processor and a memory. The master system 105 receives graph data and a user program from the client 102, assigns partitions of the graph data to the worker systems 106, provides copies of the user program to the worker systems 106, coordinates the parallel execution of the user program on the worker systems 106, and reports results of the execution to the client 102. In other embodiments, the master system 105 and worker system 106 all start simultaneously and the client 102 provides copies of the user program to the worker systems 106. In yet another embodiment, a separate system (not shown) is responsible for starting the master system 105 and the worker systems 106. The master system 105 includes a coordination module 114 that executes a copy of the user program that acts as a master or coordinator for the execution of the copies of the user program on the worker systems 106.

The coordination module 114 maintains a list of worker systems 106 that participate in a computation. The worker systems 106 send registration messages to the master system 105 and the coordination module 114 registers the worker systems 106 by assigning unique identifiers to the worker systems 106. The coordination module 114 maintains a list of the registered worker systems 106 which includes the identifiers of the registered worker systems 106 and the addressing information of the registered worker systems 106. For a respective registered worker system 106, the list includes information identifying one or more assigned graph partitions. In some embodiments, the coordination module 114 sends each worker system 106 the list of the registered worker systems 106.

The coordination module 114 determines the number of partitions the graph will have, assigns zero or more partitions to each worker system 106 and sends each worker system 106 its assigned zero or more partitions. A partition of a graph includes a subset of the vertices and edges of the graph. The number of partitions may be specified in the user program or determined by a partition function executed by the coordination module 114. For example, the default partitioning function may be a hash of a vertex identifier modulo N, where N is the number of partitions. In one embodiment, the master system 105 is not assigned any partitions of the graph.

The coordination module 114 in one embodiment sends each worker system 106 a copy of the user program and initiates the execution of the user program on the worker systems 106. More specifically, the coordination module 114 signals the beginning of a superstep. The coordination module 114 maintains statistics about the progress of a computation and the state of the graph, such as the total size of the graph, a histogram of its distribution of out-degrees, the number of active vertices, the timing and message traffic of recent supersteps.

In each superstep, the coordination module 114 receives messages from the worker systems 106. The messages include worker values that are combined by the coordination module 114 into a single global value by applying an aggregation function that may be supplied by the user program. For example, the aggregation function may sum all the incoming values to create a single global value. The global value can include any type of data, such as numbers or character strings. The global value can be small (i.e. 1 byte) or large (i.e. 5 megabytes) in size. In some embodiments, the coordination module 114 can produce multiple unique global values as a function of the incoming worker values.

At the beginning of the next superstep, the master system 105 distributes the global value to the worker systems 106 by sending control messages to the worker systems that include the global value. The worker systems 106 use the global value when applying the algorithm in the user program. For example, in a page ranking algorithm that that analyzes links between web-pages to rank the web-pages, the number of vertices across the entire graph is used as a denominator during the page ranking computation by each vertex during each superstep.

A number of different distribution schemes are available to the master system 105 for distributing the global value to the worker systems 106. Each distribution scheme represents a different hierarchal arrangement of the worker systems 106 for distributing a global value and other information from the master system 105 to the worker systems 106. One example of a distribution scheme is a direct distribution scheme in which the master distributes the global value directly to each worker system 106. Another example of a distribution scheme is an indirect distribution scheme in which the master only distributes global values directly to a subset of the worker systems. The subset of worker systems is then responsible for passing on the global value to the remaining worker systems. Distribution schemes are described in conjunction with FIGS. 4A and 4B.

In one embodiment, the coordination module 114 builds a machine-learned model that predicts which of the distribution schemes is fastest. The machine-learned model accepts configuration information about the configuration of the distributed computing environment 100 as an input and outputs an indication of the distribution scheme that is fastest. The master system 105 uses the indicated scheme to distribute the global value to the worker systems 106.

During the supersteps or after the supersteps are finished, the coordination module 114 aggregates results from the worker systems 106 and reports the results to the client 102. In some embodiments, the results include a set of values explicitly output by the vertices. In some embodiments, the results include a directed graph. Depending upon the problem, the results may describe an optimal solution to the problem, a sub-optimal but good solution to the problem, or an indication that a solution to the problem was not identified.

A worker system 106 is a computing device with a processor and a memory. The worker systems 106 and the master system 105 are similar types of systems in one embodiment. A worker system 106 includes a worker module 112 that stores one or more partitions and the state of its assigned one or more partitions. This may include the state of each vertex in the one or more partitions where the state of each vertex contains its current value, a list of its outgoing edges (which includes the vertex name for the edge's destination and the edge's current value), a queue containing incoming messages, and a flag specifying whether the vertex is active.

The worker module 112 also stores and executes a copy of the user program on the one or more partitions stored on the worker system 106. The worker module 112 executes supersteps of the user program in response to receiving instructions in the form of control messages originating from the master system 105. The control messages include one or more global values, and each worker system 106 receives the same global values in its control messages.

During a superstep, the worker module 112 executes the algorithm of the user program for each active vertex in the one or more partitions stored on the worker module 112 and any messages that were sent to the vertices in previous supersteps. When executing the algorithm, each active vertex changes its state by modifying its current value and sends messages to other vertices.

Each active vertex may also generate a contribution value that represents the vertex's contribution to a global value. For example, a contribution value for a vertex can be the number of outgoing edges from the vertex. Some active vertices may not generate any contribution values. The contribution values are combined by the worker module 112 into a single worker value with a worker aggregation function (e.g. sum, min, max). For example, the worker module 112 may sum all the contribution values from the vertices to generate a single worker value. The aggregation function applied by the worker system 106 may be the same as the aggregation function applied by the master system 105. The worker value represents the aggregation of contribution values for the graph partitions assigned to the worker system 106.

When the superstep is finished, the worker module 112 sends the results generated from the user program to the master system 105. The results include the worker value generated by aggregating the contribution values for each vertex assigned to the worker system 106. Combining the individual contribution values into a worker value reduces the amount of data transferred back to the master system 105 across the network 104.

The network 140 represents the communication pathways between the client 102, the master system 105 and the worker systems 106. In one embodiment, the network 140 uses standard Internet communications technologies and/or protocols. Thus, the network 140 can include links using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Figure 2:
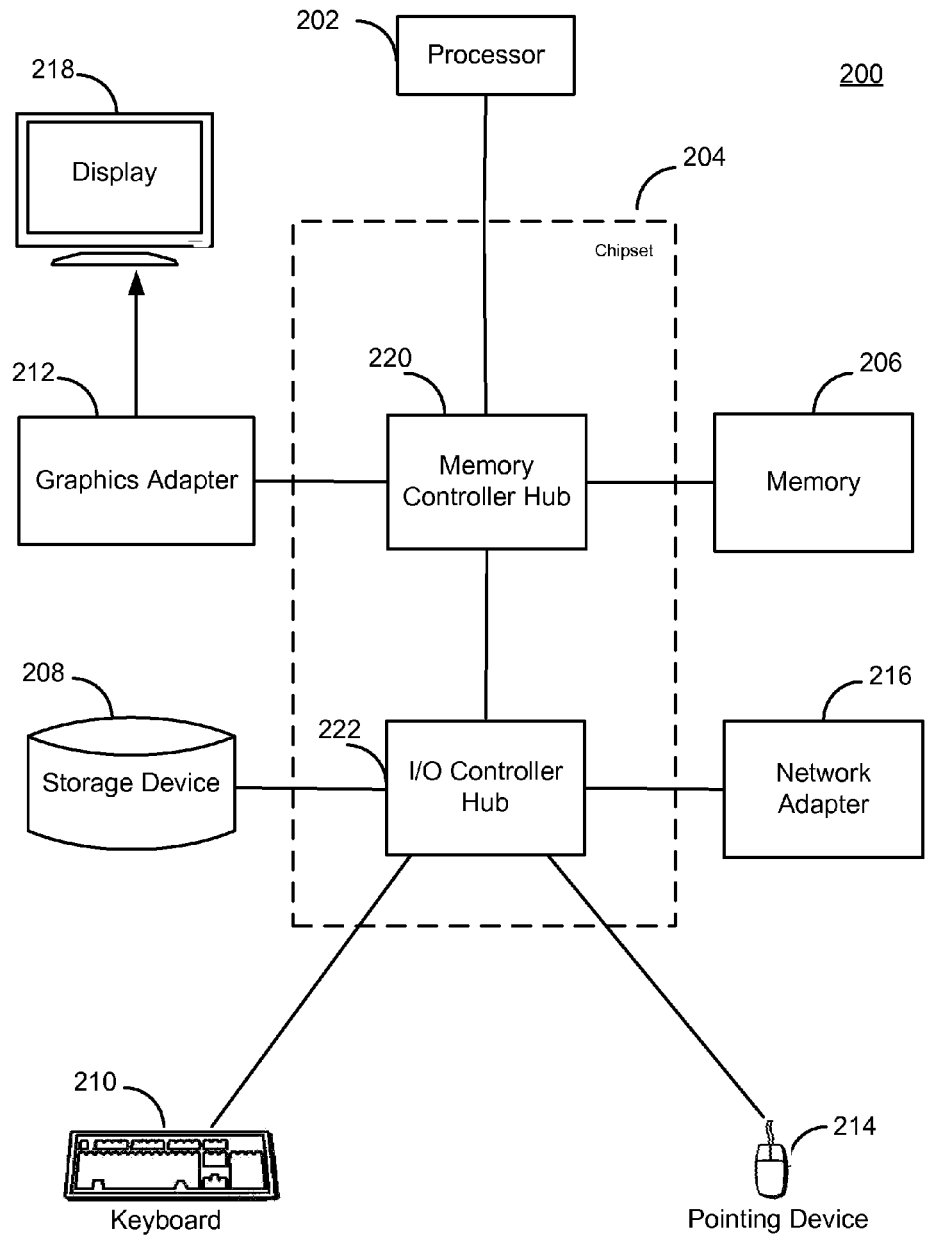
FIG. 2 is a high-level block diagram illustrating an example of a computer, according to one embodiment.

FIG. 2 is a high-level block diagram illustrating physical components of a computer 200 used as part of the client 102, master system 105 and/or worker system 106 from FIG. 1, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204. In some embodiments, memory 206 includes high-speed random access memory, such as DRAM, SRAM, DDR RAM or other random access solid state memory devices.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 140.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3A:
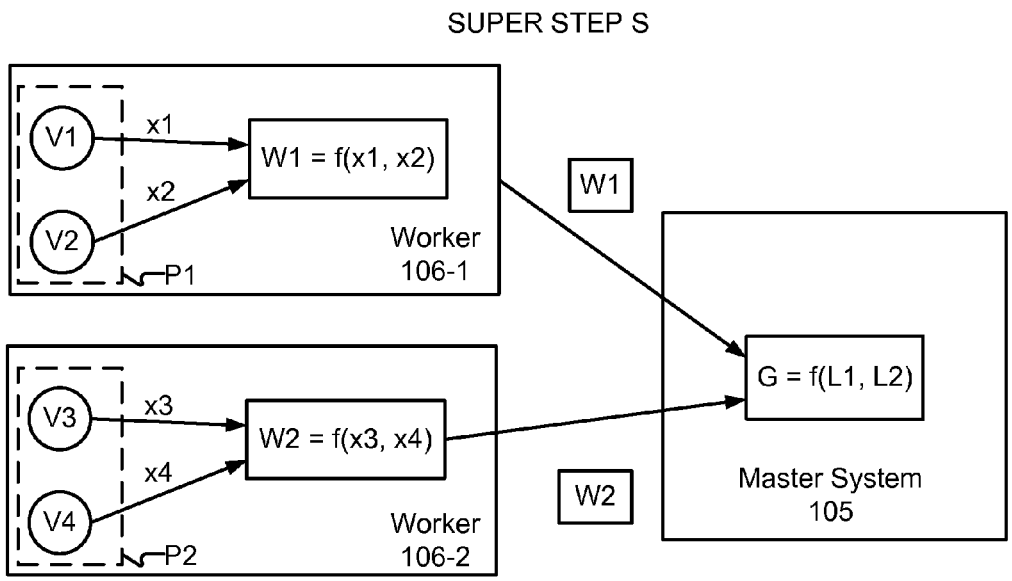
FIG. 3A is a conceptual view of the computing environment illustrating the computation of a global value during a superstep, according to one embodiment.

FIG. 3A is a conceptual view of the distributed computing system 100 illustrating the computation of global values during a superstep S, according to one embodiment. As shown, the graph includes four vertices V1, V2, V3 and V4 that are divided into two partitions P1 and P2. Partition P1 includes vertices V1 and V2 and is assigned to worker system 106-1. Partition P2 includes vertices V3 and V4 and is assigned to worker system 106-2. In other embodiments, the partitions may include fewer or lesser number of vertices, and each worker system may be assigned more than one partition of the graph.

During the superstep S, each vertex generates a contribution value that represents the vertex's contribution to the global value G. For example, vertex V1 generates contribution value x1, vertex V2 generates contribution value x2, vertex V3 generates contribution value x3 and vertex V4 generates contribution value x4. Each worker system 106 aggregates the values from the vertices in its local partitions into a worker value by applying an aggregation function. For example, worker system 106-1 computes worker value W1 as a function of x1 and x2. Worker system 106-2 computes worker value W2 as a function of x3 and x4.

The worker values are transmitted by the worker systems 106 to the master system 105 at the end of the superstep S. Once the worker values are received from all the worker systems 106, the master system 105 computes a global value G as a function of the worker values. The function applied by the master system 105 may be the same as the function applied by the worker systems 106. In other embodiments, the functions may be different.

Figure 3B:
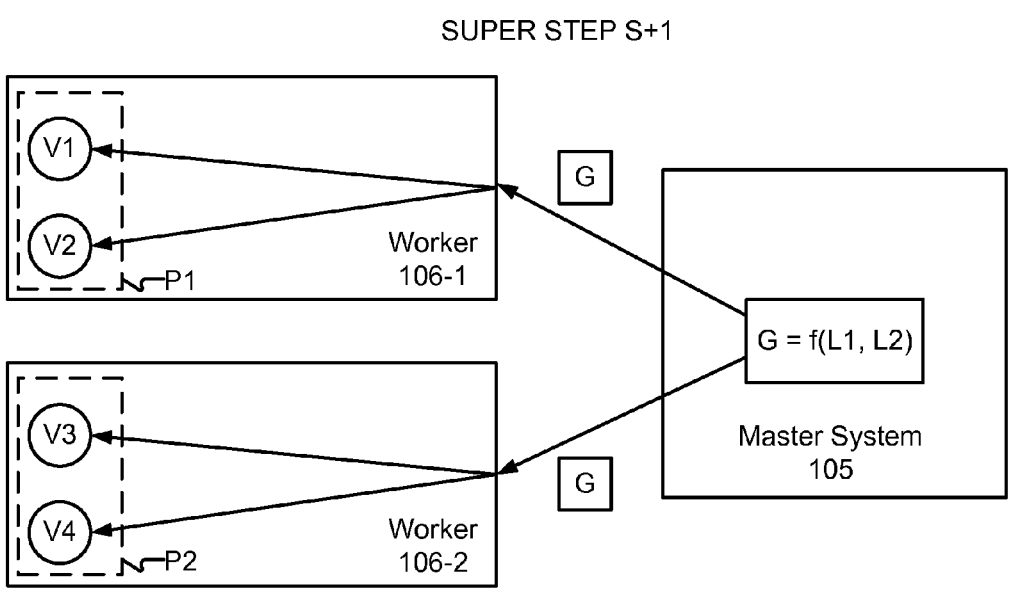
FIG. 3B is a conceptual view of the computing environment illustrating the distribution of a global value during another superstep, according to one embodiment.

FIG. 3B is a conceptual view of the distributed computing system 100 illustrating the distribution of global values during another superstep S+1, according to one embodiment. At the beginning of the next superstep S+1, the master system 105 distributes the global value G to the worker systems 106. The global value G can be distributed according to one of several different distribution schemes. Each distribution scheme represents a different hierarchal arrangement of the worker systems for distributing a global value and other information from the master system 105 to the worker systems 106. Two examples of distribution schemes for distributing a global value G are explained in conjunction with FIGS. 4A and 4B. The worker systems 106 use the global value G during the superstep S+1 to execute the algorithm of the user program on each of its vertices. This process of generating worker values and global values repeats continuously until all supersteps are completed when all vertices are simultaneously inactive and there are no messages in transit.

Figure 4A:
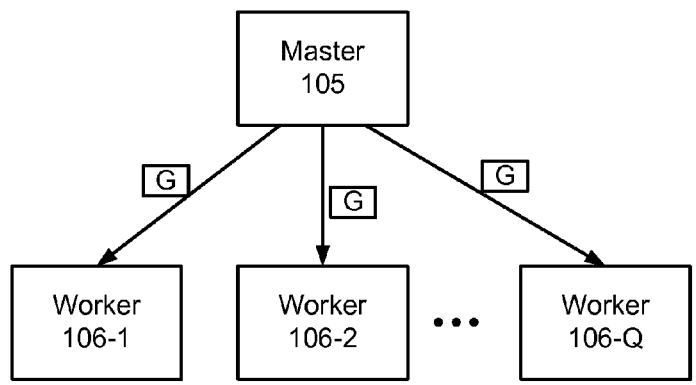
FIG. 4A is a conceptual view of the computing environment illustrating the distribution of a global value in a direct distribution scheme, according to one embodiment.

FIG. 4A is a conceptual view of the computing environment illustrating the distribution of global values in a direct distribution scheme, according to one embodiment. The worker systems 106 are organized in a flat hierarchy such that each worker system 106 receives the global value G directly from the master system 105 as part of a control message sent by the master system 105. In the direct distribution scheme, the master system 105 transmits the control messages sequentially to each worker system 106. Thus, the total time required for distributing the global value G in a direct distribution scheme can be approximated with the following formula:

$$\text{Total} = nT + L \quad \text{(equation 1)}$$

where n is the number of worker systems. T is an amount of time required for transmitting a single control message that includes the global value G. L is latency and is the amount of time required for a message to make a round trip between the master system 105 and a worker system 106. Latency can be caused, for example, by the worker system 106 that receives the messages, processes the messages, and then sends a response to the master system 105. Only the latency for a single worker system 106 (e.g. the last worker system) is included in equation 1 because the master system 105 does not wait for an acknowledgement from a previous worker system 106 before transmitting the global value G to the next worker system 106.

Figure 4B:
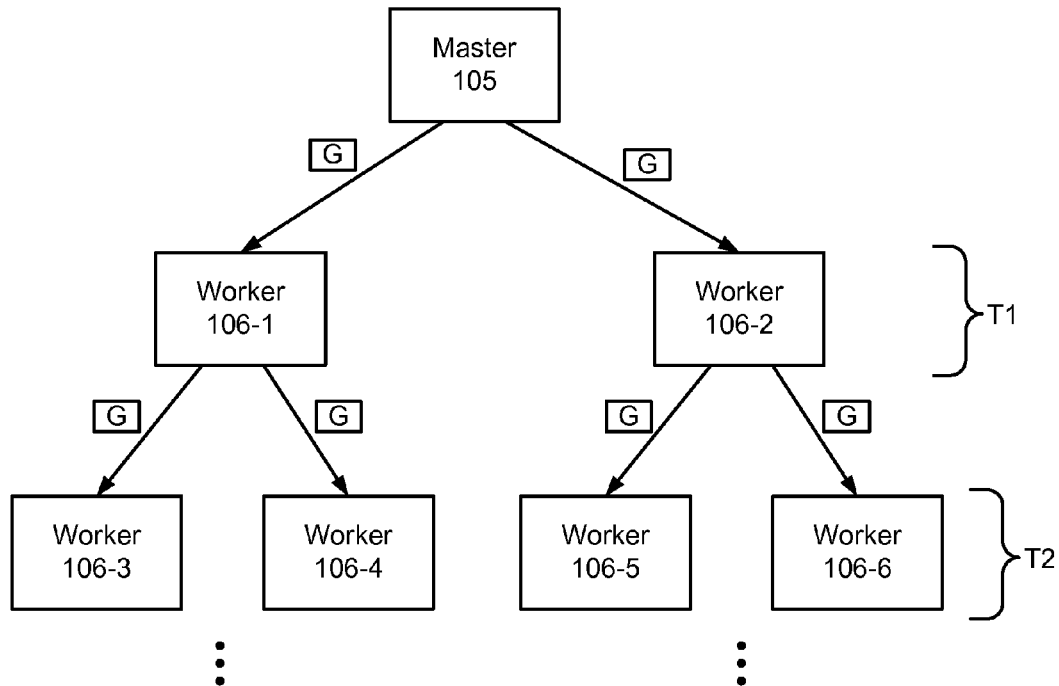
FIG. 4B is a conceptual view of the computing environment illustrating the distribution of a global value in an indirect distribution scheme, according to one embodiment.

FIG. 4B is a conceptual view of the computing environment illustrating the distribution of global values in an indirect distribution scheme, according to one embodiment. The worker systems 106 are organized as a multi-level tree such that the master system 105 is only in direct communication with a subset of the worker systems 106 in a first level T1 of the tree. To distribute the global value G to all the worker systems 106, the master system 105 sends control messages containing the global value G to the first level T1 of the tree. Each of the worker systems 106 in the first level T1 of the tree sends a similar control message containing the global value G to the subset of worker systems 106 in a lower level T2 of the tree. This process continues until all worker systems 106 receive the global value G.

The total time required for distributing the global value G in an indirect distribution scheme can be approximated with the following formula:

$$\text{Total} = (T+L) \times \log_2 n \quad \text{(equation 2)}$$

where n is the number of worker systems. T is the amount of time required for transmitting a single control message that includes the global value G. L is latency and is the amount of time required for a message to make a round trip between the master system 105 and a worker system 106.

In the indirect distribution scheme, the master system 105 receives worker values from the worker systems 106 by running the tree in reverse, so that messages are passed up the tree from worker system to worker system until the messages reach the master system. In one embodiment, when running the tree in reverse, each worker system 106 computes a worker value not only as a function of the values from its own vertices, but also as a function of the worker values received from a lower level of the tree. Worker system 106-1 thus computes a worker value to send to master system 105 as a function of the values from its own vertices and the worker values received from worker system 106-3 and 106-4.

As indicated by equation (1) and equation (2), the speed of the distribution schemes of FIGS. 4A and 4B will vary depending on the values of T, L, and n. Generally speaking, the direct distribution scheme has the advantage that it reduces the number of message re-transmissions in the system, and improves performance when latency L is a bottleneck. The indirect distribution scheme reduces the number of bytes that the master transmits. The indirect distribution scheme thus improves performance, for example, when master system network traffic is a bottleneck. Thus, selecting the proper distribution scheme can result in a significant improvement in processing speed, depending on the configuration of the computing environment.

In other embodiments, other indirect distribution schemes other than that shown in FIG. 4B may be possible. For example, the indirect distribution scheme can be configured such that the master system 105 directly communicates with more than just two worker systems 106. Additionally, each worker system 106 may pass on the global value G to more than just two other worker systems 106.

Figure 5:
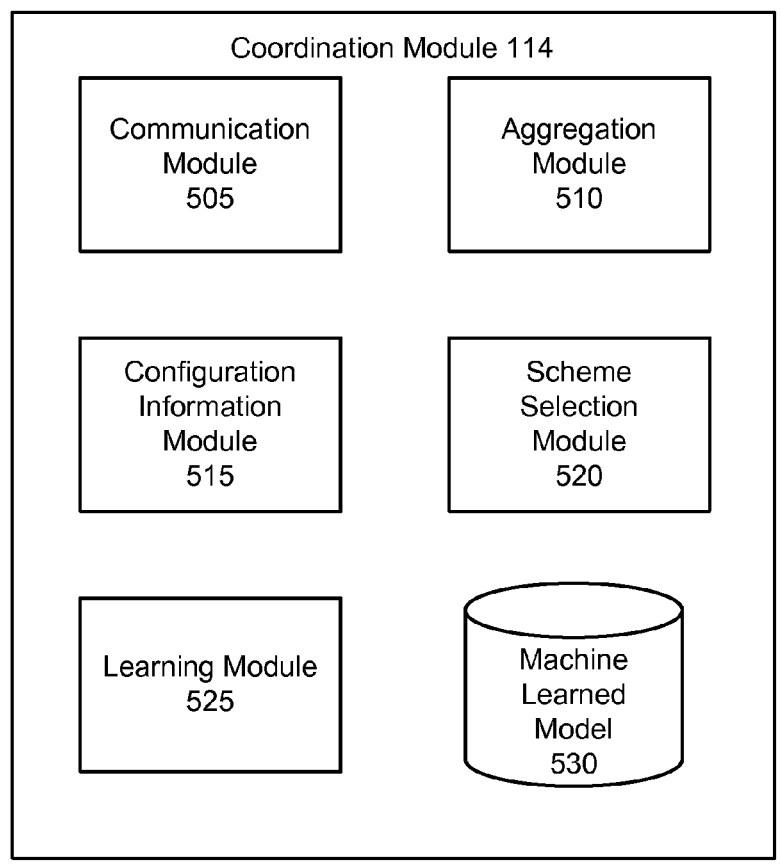
FIG. 5 is a high-level block diagram illustrating modules within a coordination module for distribution of global values, according to one embodiment.

FIG. 5 is a high-level block diagram illustrating modules within the coordination module 114 of a master system 105 for distributing the global values, according to one embodiment. The coordination module 114 includes a communication module 505, an aggregation module 510, a configuration information module 515, a scheme selection module 520, a learning module 525, and a machine-learned model 530.

The communication module 505 interfaces with the network 104 to communicate with the worker systems 106 and client device 102. Prior to any supersteps, the communication module 505 sends configuration messages to the worker systems 106 to prepare the distributed computing system 100 for executing a user program. The configuration messages assign partitions of the graph to the worker systems 106. In some embodiments, the configuration messages inform the worker systems 106 about the distribution scheme that is to be used when distributing global values. If the distribution scheme to be used is an indirect distribution scheme, the configuration messages also inform the worker systems 106 of their place in the hierarchy of the distribution scheme. For example, each worker system 106 is provided with information about the other systems that are directly below and above the worker system 106 in the hierarchy. This information is used by the worker systems 106 during the supersteps in transmitting global and worker values to the other systems.

During the supersteps, the communication module 505 receives incoming messages from the worker systems 106 that include worker values for aggregation. The communication module 510 also distributes global values to the worker systems 106 by transmitting control messages that include the global values. During the supersteps or after all the supersteps are completed, the communication module 505 also communicates with the client device 102 to report results of the program execution.

The aggregation module 510 computes a global value as a function of the worker values received from the worker systems 106. The function applied by the aggregation module 510 may be defined by the user program, may be a default function in the event that the user program does not have an aggregation function, or the user program may select a function from a list of pre-defined functions. The function can be any of a number of different functions that aggregate the worker values into a global value. Examples of functions include the sum of the worker values, the minimum of the worker values, the maximum of the worker values, a logical AND of the worker values, a logical OR of the worker values, etc. Other functions are also possible and can be tailored to the needs of a particular user program and the type of graph stored in the distributed computing system 100. In one embodiment, there aggregation module 510 may compute multiple global values, each one computed with a different aggregation function. Each of the global values can also be computed from the same set of worker values or from different sets of worker values.

The configuration information module 515 determines (e.g., by collecting) configuration information that represents the configuration of the distributed computing system 100. The configuration information can be viewed as settings for different configuration parameters that potentially affect the amount of time needed to distribute a global value to the worker systems 160 through a given distribution scheme. Different types of configuration information include, but are not limited to, network capability information, computing capability information, graph configuration information, and global value information.

Network capability information includes information that describes the capabilities of the network 104. For example, the network capability information information may include the master system's network bandwidth (e.g., 1 Gbit or 100 Mbits), which can be determined from the type of interface card installed in the master system 105. The network capability information may also include the amount of network contention, which can be determined from a network monitoring system that is installed on the network 104. The network capability information may also include other information such as network latency between the master system 105 and worker systems 106, latency between the worker systems, or network bandwidth of the worker systems 106.

Computing capability information includes information about the computing capabilities of the master system 105 and/or worker systems 106. For example, the configuration information may include the number of processors, processor cores, processor speed, memory cores, or other information about the computing capabilities of the master system 105 or worker systems 106 that are relevant to how quickly the systems can process data.

Graph configuration information includes information about the configuration of the graph in the worker systems. For example, the graph configuration information may include the number of partitions assigned to each worker system, the number of vertices in each partition, or the total number of vertices assigned to each worker system.

Global value information includes information that describe the amount of data that will be transferred when sending the global value. For example, the global value information may include the size of the global value in bits or bytes. The variable type (e.g. double, int) of a global value may be defined in the user program, and the size of the global value can be determined from the type of the global value. As another example, some user programs may compute and distribute more than one unique global value during a single superstep. The global values are distributed as part of a single control message to conserve network bandwidth in one embodiment. The configuration information can thus include the number of unique global values that will be sent during a single superstep. In other embodiments, other types of configuration information may also be determined by the configuration information module 515, such as the number of worker systems.

The scheme selection module 520 selects a distribution scheme for distributing the global value. The scheme selection module 520 is configured to select an appropriate distribution scheme from amongst two or more possible distribution schemes, depending on which distribution scheme is most likely to result in the fastest distribution of the global value to the worker systems 160. For example, the available distribution schemes may be a direct distribution scheme and an indirect distribution scheme, and the scheme selection module 520 selects one of the two distribution schemes. As another example, the available distribution schemes may be different types of indirect distribution schemes, and the scheme selection module 520 selects the indirect distribution scheme that is likely to be the fastest.

In some embodiments, the scheme selection module 520 selects a distribution scheme for distributing the global value prior to a first superstep. The selected distribution scheme is then used during all subsequent supersteps until the algorithm of the user program terminates. In other embodiments, the scheme selection module 520 may undergo the selection process at the beginning of each superstep or only certain supersteps. As a result, the distribution scheme during one superstep may be different than the distribution scheme during a subsequent superstep. Selecting a new distribution scheme at each superstep may be appropriate if wide variations in the configuration information are expected from one superstep to the next.

In one embodiment, to select the appropriate distribution scheme, the scheme selection module 520 applies the configuration information determined by the configuration information module 515 to the machine-learned model 530. The machine-learned model 530 is configured to accept the configuration information as an input, and to output an indication of a distribution scheme based on the configuration information. The scheme selection module 520 selects the distribution scheme indicated by the output of the machine-learned model 530. The selected scheme is likely to result in the fastest distribution of the global value to the worker systems 106 when compared to the other possible distribution schemes. In one embodiment, the machine-learned model 530 is constructed during a machine learning process described in conjunction with the learning module 525.

The learning module 525 generates a machine-learned model 530 that can be used to automatically select a distribution scheme from amongst two or more distribution schemes. The machine-learned model 530 accepts configuration information as an input, and outputs an indication of a distribution scheme based on the configuration information. In some embodiments, the learning module 525 may only be included in the master system 105 when the machine-learned model 530 is being built, and then removed once the machine-learned model is constructed.

Figure 6:
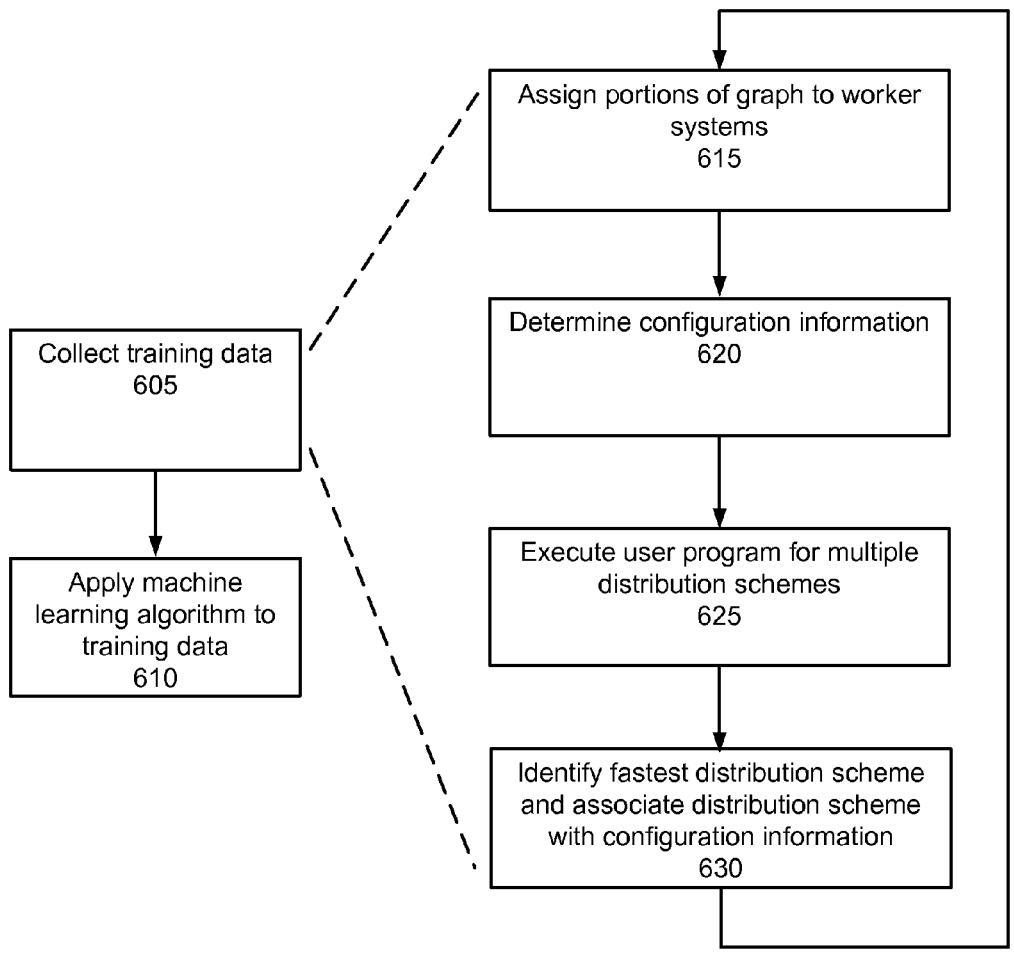
FIG. 6 is a flow diagram that illustrates a process for training a machine-learned model for distribution of global values, according to one embodiment.

FIG. 6 is a flow diagram that illustrates a process for training a machine-learned model for distribution of global values, according to one embodiment. Learning can be divided into two stages. First, the learning module 525 collects 605 training data. Next, the learning module 525 applies 610 a machine learning algorithm to the training data to generate the machine-learned model 530.

Generally speaking, the learning module 525 collects 605 training data by observing many different runs of user programs. Each user program is executed at least once for each distribution scheme while holding the configuration information constant for each execution of the user program. The fastest of the distribution schemes is identified and associated with the configuration parameters. The process may be repeated under different configurations of the distributed computing system 100 (e.g., with different user programs, different graphs, different worker systems 106, different network, etc). With each iteration the learning module 525 collects a different set of configuration information and associates the configuration information with a distribution scheme to generate a collection of training data.

Specifically, in step 615, a graph is divided into partitions and assigned to the worker systems of the distributed computing system 100. The graph may represent relationships among a set of tangible items that model a real-world condition having an associated problem. In some embodiments, the graph may be a training graph that has been specifically designed for training purposes.

In step 620, configuration information representing a configuration of the distributed computing system 100 is determined. The types of configuration information selected for training are typically set by a user of the distributed system 100 to focus the training on particular types of configuration information. In this sense, the learning process requires some supervision by a user of the distributed computing system 100.

In step 625, a user program is executed using multiple distribution schemes but without altering the configuration of the distributed computing system 100. For example, the user program may be executed once with a direct distribution scheme and executed another time with an indirect distribution scheme, both runs executed without altering the configuration of the distributed computing system 100. The user program used during training may be any type of user program that distributes global values during the execution of the program. In some embodiments the user program may be a training program that is specifically written for training purposes.

In step 630, the learning module 525 identifies the fastest distribution scheme associated with the configuration information and labels the configuration information with the fastest distribution scheme. To identify the fastest distribution scheme, the learning module 525 measures an amount of time associated with the distribution of global values in the distribution schemes from step 625. Continuing with the previous example, a first amount of time may be measured for the indirect distribution scheme and a second amount of time may be measured for the direct distribution scheme. If the time associated with the indirect distribution scheme is shorter than the time associated with the direct distribution scheme, it is determined that the indirect distribution scheme is faster. Any amount of time that is a proxy for the speed of a given distribution scheme can be measured. For example, the amount of time may be the time needed to complete all supersteps during the execution of the program. Alternatively, the amount of time may be the time needed to distribute the global value to all the worker systems during a single superstep.

The process may be repeated multiple times with different configurations of the distribution computing system 100 (e.g., with different graphs, different user programs, different worker systems, etc) to generate multiple entries for the training data. Each entry in the training data can be viewed as a set of configuration information and a label that represents the distribution scheme that resulted in the fastest distribution of global values with that set of configuration information. The training data may be stored in a table or other data structure that is appropriate for storing the training data. Table 1 below illustrates three different entries in the training data when the configuration parameters being trained are number of worker systems, size of the global value, and the network bandwidth:

TABLE 1

| Entry | # Worker Systems | Global Value Size | Network Bandwidth | Fastest Distrib. Scheme |
|---|---|---|---|---|
| 1 | 2000 | 8 bytes | 100 Mbits | Indirect |
| 2 | 400 | 1 byte | 1 Gbit | Direct |
| 3 | 1800 | 8 bytes | 100 Mbits | Indirect |

In Table 1, entry 1 indicates that when there are 2000 worker systems, the global value size is 8 bytes, and the network bandwidth is 100 Mbits, the indirect distribution scheme is faster than the direct distribution scheme. Entry 2 indicates that when there are 400 worker systems, the global value size is 1 byte, and the network bandwidth is 1 Gbit, the direct distribution scheme is faster. Entry 3 indicates that when there are 1800 worker systems, the global value size is 8 bytes, and the network bandwidth is 100 Mbits, the indirect distribution scheme is faster. Only three entries are shown for clarity, but in other embodiments there may be hundreds of thousands of entries in the training data, and each entry may include configuration information for a larger number of configuration parameters.

After the training data is collected 605, the learning module 525 applies 610 a machine learning algorithm, such as a support vector machine (SVM) algorithm, to the training data to build the machine-learned model 530. Given a set of training entries, each labeled as belonging to one of two distribution schemes, an SVM training algorithm builds a statistical model that assigns new configuration information into one distribution scheme or the other. Thus, an embodiment of the learning module 525 uses a supervised learning method to analyze the training data and recognize patterns that are then used to build a non-probabilistic binary linear classifier that serves as the machine-learned module 530. SVM is simply provided as an example of a machine learning algorithm, and in other embodiments different machine learning algorithms and types of models may be used.

Figure 7:
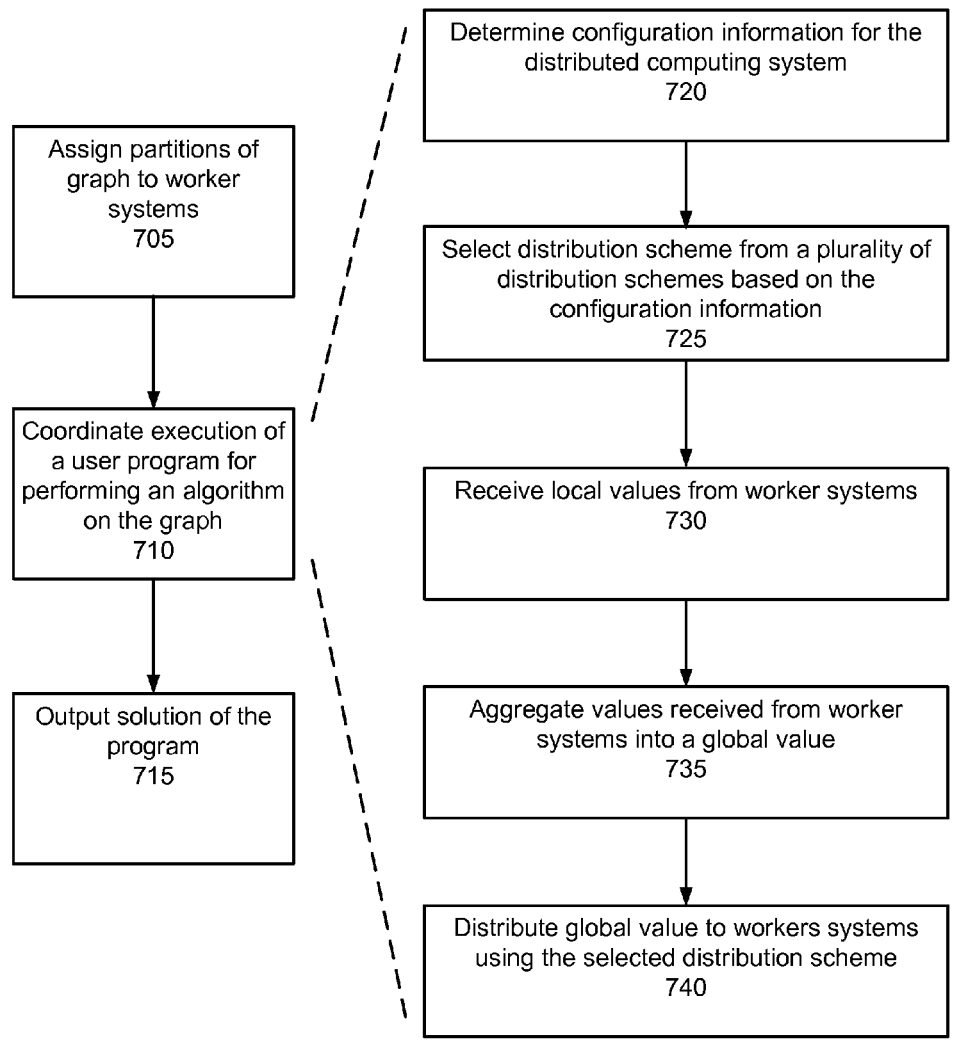
FIG. 7 is a flow diagram that illustrates a process for solving a problem represented by a graph, according to one embodiment.

FIG. 7 is a flow diagram that illustrates a process for analyzing a real-world problem represented by a graph, according to one embodiment. The graph represents relationships among a set of tangible items that model the real-world problem, and the output of the process represents a solution to the modeled real-world problem. In one embodiment, the steps shown in FIG. 7 are performed by the modules of the coordination module 114 of the master system 105.

In step 705, the coordination module 114 assigns partitions of the graph to the worker systems 106. In step 710, the coordination module 114 coordinates execution of a user program in the worker systems for performing an algorithm on the graph. Coordination may involve sending configuration messages to the worker systems 106, sending control messages to the worker systems that initiate supersteps, and receiving return messages from the worker systems at the ends of the supersteps. In step 715, the coordination module 114 outputs a result of the program execution for, e.g., display to a user of the client 102 and/or real-world implementation to solve the modeled problem.

Step 710, coordinating execution, can be sub-divided into several sub steps. In step 720, the configuration information module 515 determines configuration information that describes a configuration of the computing environment. The configuration information can include information corresponding to, for example, network capabilities of the distributed computing system, computing capabilities of the worker systems 106, a configuration of the graph across the worker systems 106, an amount of data to be transferred to the worker systems 106 when distributing the global value, and other pertinent configuration information.

In step 725, the scheme selection module 520 selects a distribution scheme from among multiple distribution schemes based on the configuration information. Each distribution scheme defines a different hierarchal arrangement of the worker systems for distributing a global value from the master system to the worker systems. Examples of distribution schemes include a direct distribution scheme or an indirect distribution scheme. In selecting the distribution scheme, the scheme selection module 520 may apply the configuration information to a machine-learned model 530, which then outputs an indication of the distribution scheme that is likely to result in the fastest distribution of the global value. The scheme selection module 520 selects a distribution scheme based on the output of the machine-learned model 530. The machine-learned model 530 may have been previously built by training a binary classifier using training data including multiple different sets of configuration information, user programs, and distribution schemes.

In step 730, the communication module 505 receives worker values from the worker systems 106. In step 735, the aggregation module 735 aggregates values received from the worker systems 106 into a global value. The aggregation module 735 may apply an aggregation function provided by the user program to generate the global value. In step 740, the communication module 505 then distributes the global value to the worker systems according to the selected distribution scheme. The worker systems 106 use the global value to produce an output representing a solution to the problem modeled by the graph.

Several of the steps shown in FIG. 7 may repeat with each superstep. For example, steps 720-740 may repeat with each round of supersteps. In other embodiments, only steps 730-740 repeat with each round of supersteps so that same distribution scheme is used during all supersteps.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for distributing global values in a graph processing system. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method of distributing a value within a distributed computing system having a master system in communication with a plurality of worker systems, comprising:
   assigning partitions of a graph to the worker systems, the graph representing relationships among a set of tangible items that model a real-world condition having an associated problem;
   determining configuration information describing a configuration of the distributed computing system;
   selecting a distribution scheme, from among a plurality of distribution schemes, for distributing a value from the master system to the plurality of worker systems based on the configuration information, each of the plurality of distribution schemes defining a different hierarchal arrangement for distributing the value from the master system to the plurality of worker systems; and
   distributing the value from the master system to the worker systems according to the selected distribution scheme, wherein the worker systems are configured to use the value to produce an output representing a solution to the real-world problem,
   wherein the plurality of distribution schemes comprise a first distribution scheme where the worker systems receive the value directly from the master system and a second distribution scheme that organizes the worker systems into at least a first subset and second subset of worker systems, where the first subset of the worker systems receive the value directly from the master system and the second subset of the worker systems receive the value indirectly from the master system via the first subset of the worker systems.

2. The method of claim 1, wherein:
   the configuration information comprises information corresponding to network capabilities of a network communicatively coupling the master system with the plurality of worker systems, and
   the distribution scheme is selected based on the capabilities of the network.

3. The method of claim 1, wherein:
   the configuration information comprises information corresponding to computing capabilities of the worker systems, and
   the distribution scheme is selected based on the computing capabilities of the worker systems.

4. The method of claim 1, wherein:
   the configuration information comprises information corresponding to a configuration of the graph partitions assigned to the worker systems, and
   the distribution scheme is selected based on the configuration of the graph partitions assigned to the worker systems.

5. The method of claim 1, wherein:
   the configuration information comprises information corresponding to an amount of data used to represent the value to be distributed from the master system to the plurality of worker systems, and
   the distribution scheme is selected based on the amount of data used to represent the value to be distributed from the master system to the plurality of worker systems.

6. The method of claim 1, wherein:
   the configuration information comprises information corresponding to a number of worker systems in the distributed computing system, and
   the distribution scheme is selected based on the number of worker systems.

7. The method of claim 1, wherein selecting a distribution scheme comprises:
   applying the configuration information to a machine-learned model that outputs an indication of a distribution scheme; and
   selecting the distribution scheme indicated by the output of the machine-learned model.

8. The method of claim 1, further comprising:
   receiving, at the master system, first values from the plurality of worker systems;
   determining a second value as a function of the first values; and
   wherein the value distributed to the worker systems is the second value.

9. The method of claim 7, further comprising:
   collecting training data that includes associations between a plurality of sets of configuration information and a plurality of distribution schemes; and
   training the machine-learned model based on the associations in the training data,
   wherein the configuration information is applied to the trained machine-learned model.

10. The method of claim 7, wherein the machine-learned model is a binary classifier.

11. The method of claim 8, wherein the worker systems operate in synchronized steps under the control of the master system, the first values are received from the plurality of worker systems during one of the steps, and the second value is distributed to the worker systems during a subsequent step.

12. A non-transitory computer readable storage medium storing executable computer program instructions for distributing a value within a distributed computing system having a master system in communication with a plurality of worker systems, the instructions comprising instructions for:
    assigning partitions of a graph to the worker systems, the graph representing relationships among a set of tangible items that model a real-world condition having an associated problem;
    determining configuration information describing a configuration of the distributed computing system;
    selecting a distribution scheme, from among a plurality of distribution schemes, for distributing a value from the master system to the plurality of worker systems based on the configuration information, each of the plurality of distribution schemes defining a different hierarchal arrangement for distributing the value from the master system to the plurality of worker systems; and
    distributing the value from the master system to the worker systems according to the selected distribution scheme, wherein the worker systems are configured to use the value to produce an output representing a solution to the real-world problem,
    wherein the plurality of distribution schemes comprise a first distribution scheme where the worker systems receive the value directly from the master system and a second distribution scheme that organizes the worker systems into at least a first subset and second subset of worker systems, where the first subset of the worker systems receive the value directly from the master system and the second subset of the worker systems receive the value indirectly from the master system via the first subset of the worker systems.

13. The computer readable storage medium of claim 12, wherein selecting a distribution scheme comprises:
    applying the configuration information to a machine-learned model that outputs an indication of a distribution scheme; and
    selecting the distribution scheme indicated by the output of the machine-learned model.

14. The computer readable storage medium of claim 12, the instructions further comprising instructions for:
    receiving, at the master system, first values from the plurality of worker systems;
    determining a second value as a function of the first values; and
    wherein the value distributed to the worker systems is the second value.

15. The computer readable storage medium of claim 13, the instructions further comprising instructions for:
    collecting training data that includes associations between a plurality of sets of configuration information and a plurality of distribution schemes; and
    training the machine-learned model based on the associations in the training data,
    wherein the configuration information is applied to the trained machine-learned model.

16. The computer readable storage medium of claim 13, wherein the machine-learned model is a binary classifier.

17. The computer readable storage medium of claim 14, wherein the worker systems operate in synchronized steps under the control of the master system, the first values are received from the plurality of worker systems during one of the steps, and the second value is distributed to the worker systems during a subsequent step.

18. A master system of a distributed computing system, the master system in communication with a plurality of worker systems of the distributed computing system and comprising:
    a non-transitory computer readable storage medium storing processor-executable computer program instructions, the instructions comprising instructions for:
        assigning partitions of a graph to the worker systems, the graph representing relationships among a set of tangible items that model a real-world condition having an associated problem;
        determining configuration information describing a configuration of the distributed computing system;
        selecting a distribution scheme, from among a plurality of distribution schemes, for distributing a value from the master system to the plurality of worker systems based on the configuration information, each of the plurality of distribution schemes defining a different hierarchal arrangement for distributing the value from the master system to the plurality of worker systems; and
        distributing the value from the master system to the worker systems according to the selected distribution scheme, wherein the worker systems are configured to use the value to produce an output representing a solution to the real-world problem,
        wherein the plurality of distribution schemes comprise a first distribution scheme where the worker systems receive the value directly from the master system and a second distribution scheme that organizes the worker systems into at least a first subset and second subset of worker systems, where the first subset of the worker systems receive the value directly from the master system and the second subset of the worker systems receive the value indirectly from the master system via the first subset of the worker systems; and
    a processor for executing the instructions.

19. The system of claim 18, wherein selecting a distribution scheme comprises:
    applying the configuration information to a machine-learned model that outputs an indication of a distribution scheme; and
    selecting the distribution scheme indicated by the output of the machine-learned model.

20. The system of claim 18, the instructions further comprising instructions for:
    receiving, at the master system, first values from the plurality of worker systems;
    determining a second value as a function of the first values; and
    wherein the value distributed to the worker systems is the second value.

21. The system of claim 19, the instructions further comprising instructions for:
    collecting training data that includes associations between a plurality of sets of configuration information and a plurality of distribution schemes; and
    training the machine-learned model based on the associations in the training data,
    wherein the configuration information is applied to the trained machine-learned model.

22. The system of claim 19, wherein the machine-learned model is a binary classifier.

23. The system of claim 20, wherein the worker systems operate in synchronized steps under the control of the master system, the first values are received from the plurality of worker systems during one of the steps, and the second value is distributed to the worker systems during a subsequent step.

\* \* \* \* \*